United States Patent [19]

Lynn

[11] Patent Number: 5,325,638
[45] Date of Patent: Jul. 5, 1994

[54] PLIANT MEDIA BLASTING DEVICE

[76] Inventor: William R. Lynn, 38 Prospect St., Dover, N.H. 03820

[21] Appl. No.: 945,221

[22] Filed: Sep. 15, 1992

Related U.S. Application Data

[63] Continuation-in-part of Ser. No. 543,325, Jun. 25, 1990, which is a continuation-in-part of Ser. No. 376,764, Jul. 7, 1989, abandoned.

[51] Int. Cl.$^5$ .............................................. B24C 1/00
[52] U.S. Cl. ........................................ 51/320; 51/436
[58] Field of Search ................. 51/319, 320, 321, 410, 51/436

[56] References Cited

U.S. PATENT DOCUMENTS

| | | | |
|---|---|---|---|
| 2,624,988 | 1/1953 | Vander Wal | 51/320 |
| 3,461,478 | 8/1969 | Taylor | 134/7 |
| 3,716,066 | 2/1973 | Currier et al. | 134/7 |
| 3,994,097 | 11/1976 | Lamb | 51/321 |
| 4,158,576 | 6/1979 | Butz | 134/7 |
| 5,092,084 | 3/1992 | Schlick | 51/320 |

OTHER PUBLICATIONS

The Softcell Approach To Hard Surface Cleaning, D. Jagoda Murphy and J. A. Smith, pp. 233-236-Proceedings of the SPI 28th Annular Technical/Marketing Conference, Nov. 5-7, 1984 in San Antonio, Texas, Polyurethane Marketing and Technology Partners in Progress.

Primary Examiner—Robert A. Rose

[57] ABSTRACT

The invention relates to a method and to a pliant particulate media device for the same which includes a supply of pliant blasting media, a medium for conveying the pliant blasting media from the supply and a discharge line. The supply is connected with a feed device that meters out a desired quantity of blasting media into a discharge line which conveys the blasting media to a discharge nozzle where it is discharged against a surface to be treated to achieve the desired treatment.

6 Claims, 8 Drawing Sheets

PLIANT MEDIA BLASTING DEVICE

This is a continuation-in-part of co-pending application Ser. No. 07/543,325 filed Jun. 25, 1990 which is a continuation-in-part of application Ser. No. 07/376 764 filed Jul. 7 1989 now abandoned.

The present invention relates to an improved blasting method for cleaning, degreasing and/or desooting a surface by using a pliant material of a desired porosity and size which is propelled by air pressure or a liquid to impact against the surface and provide the necessary surface treatment.

DISCUSSION OF THE PRIOR ART

A variety of blasting devices are known in the prior art and such devices typically dispense materials which are relatively abrasive and heavy. The following six patents depict blasting devices and methods which are typical of the prior art.

U.S. Pat. No. 2,426,072 issued to Ridgewood et al on Aug. 19, 1947 relates to a method of projecting solid particles at high velocity against a surface to achieve the necessary cleaning. The disclosed projected particles are solid particles consisting of a synthetic resin having a desired impact strength and elongation and the contemplated materials are polymers.

U.S. Pat. No. 2,624,988 issued to Vander Wal on Jan. 13, 1953 relates to a polishing and buffering liquid composition which is supplied at a pressure of approximately 200 pounds per square inch. The liquid composition is discharged, via flexible conduits, through nozzles and impinges on the article to be cleaned, and this can be seen in FIGS. 1 and 2. The liquid typically contains fragments of sponge rubber and fragments of felt, on the order of a quarter inch in diameter, which are used as a carrier for the abrasive material.

U.S. Pat. No. 2,652,662 issued to Newell on Sep. 22, 1953 relates to an improved blasting apparatus which prevents bridging or jamming of the blasting grit material. This is achieved by employing agitating means such as a conduit having a plurality of downwardly directed holes, extending within and across the tank, for discharging a plurality of fluid streams into the hopper in order to assure that the blasting grit material is uniformly discharged and does not jam the hopper or opening. The air supplied to the agitating means helps to pressurize the tank.

U.S. Pat. No. 2,910,812 issued to Brunner on Nov. 3, 1959 relates to a method of moistening black walnut shell grit so that it has greater impact and does not tend to accumulate a static charge which causes some of the grit particles to stick to the article being blasted. The reference teaches an arrangement in which water is sprayed from a nozzle, inside chamber, to moisten the black walnut shell grit to about a 10% moisture content.

U.S. Pat. No. 3,313,067 issued to Smith et al on Apr. 11, 1967 relates to a process for propelling discrete particles of polycarbonate resin having a mean diameter from about 25 mils to about 200 mils. The propelled particles have a velocity of between 50 and 300 feet per second and the particles are sprayed for a sufficient period of time to remove any "flashing" from the surface being treated.

U.S. Pat. No. 4,731,125 issued to Carr on Mar. 15, 1988 relates to a surface cleaning method for removing paint and other coatings from composite surfaces formed of reinforced matrix material. The projected media has a Mobs scale hardness number lower than 3.5 and is accelerated by air at a pressure of approximately 40 pounds per square inch. This patent also indicates that the blasting process has the ability to selectively remove outer layers of material while leaving the underlying layers intact.

Although the above-discussed prior art blasting equipment teaches that the use of particulate abrasive material to clean a surface is well-known, such devices are typically only useful for dispensing materials of large, individual grain sizes and high density while very pliant and low density materials cannot be effectively used. Moreover, the prior art blasting systems typically rely on gravity feed for imputing the blasting media into the pressurized air stream. When attempts are made to dispense a low density material from the known prior art blasting equipment, it is extremely difficult to obtain a constant metered flow of the material and bridging, jamming, etc., and other related feed problems quite often occur in such devices.

While the blasting media used in known blasting systems can often be recovered, screened and reused in various manners, in none of the known recovery systems is it possible to actually flush liquid contaminants captured in the pores of porous grit material, removed from the surface being cleaned, completely from the blasting media. Furthermore, many of the blasting materials used by the prior art have the disadvantage of generating substantial amounts of dust and contaminants.

OBJECTS OF THE INVENTION

Wherefore, it is a primary object of the invention to provide a cleaning, degreasing and/or desooting apparatus which can use various light, pliant materials to accomplish the desired surface treatment of an object, wall, or other article.

A second object of the invention is to employ a light material which is essentially free from dust and less aggressive to most surfaces than the known prior art blasting media.

A further object of the invention is to provide a supply container/mechanical feed arrangement which positively meters a desired quantity of the pliant blasting media into a pressurized air stream.

A still further object of the invention is to provide a system which allows the pliant blasting media to be recovered, separated, cleaned, flushed and/or dried so that the blasting media can be reused.

An additional object of the invention is to employ porous and/or non-porous blasting media which can be pretreated with liquids, powders, chemicals and/or solvents, before use, to enhance their action (cleaning, polishing, paint removing, etc.) of the surface.

A further object of the invention is to employ blasting media which is much safer for the operator of the blasting device to use and much easier to contain because the blasting media only has a minimal tendency to ricochet off the surface being treated.

Another object of the invention is to provide a media which is useful in treating (cleaning, degreasing and/or desooting) objects containing electrical wiring and other electronic components without damaging those electrical components.

A still further object of the invention is to reduce the amount of contaminated liquid generated during the cleaning and/or degreasing operation because the media entraps and carries away the contaminants, and does not merely dilute the contaminants.

The term "pliant blasting media" as used herein, means a light resilient material such as sponge, rubber, plastic or foam, including both open and closed cell, as well as other materials, such as hydrophilic sponge having a density of 50 lb/ft.$^3$ or less.

DESCRIPTION OF THE DRAWINGS

The above and other objects of the invention will be further understood by having reference to the accompanying drawings which illustrate, by way of example, the preferred embodiments of the invention, it being understood that other embodiments employing the same basic principals and falling within the inventive concept may be made as will be readily apparent to those skilled in the art.

In the drawings.

Figure 1:
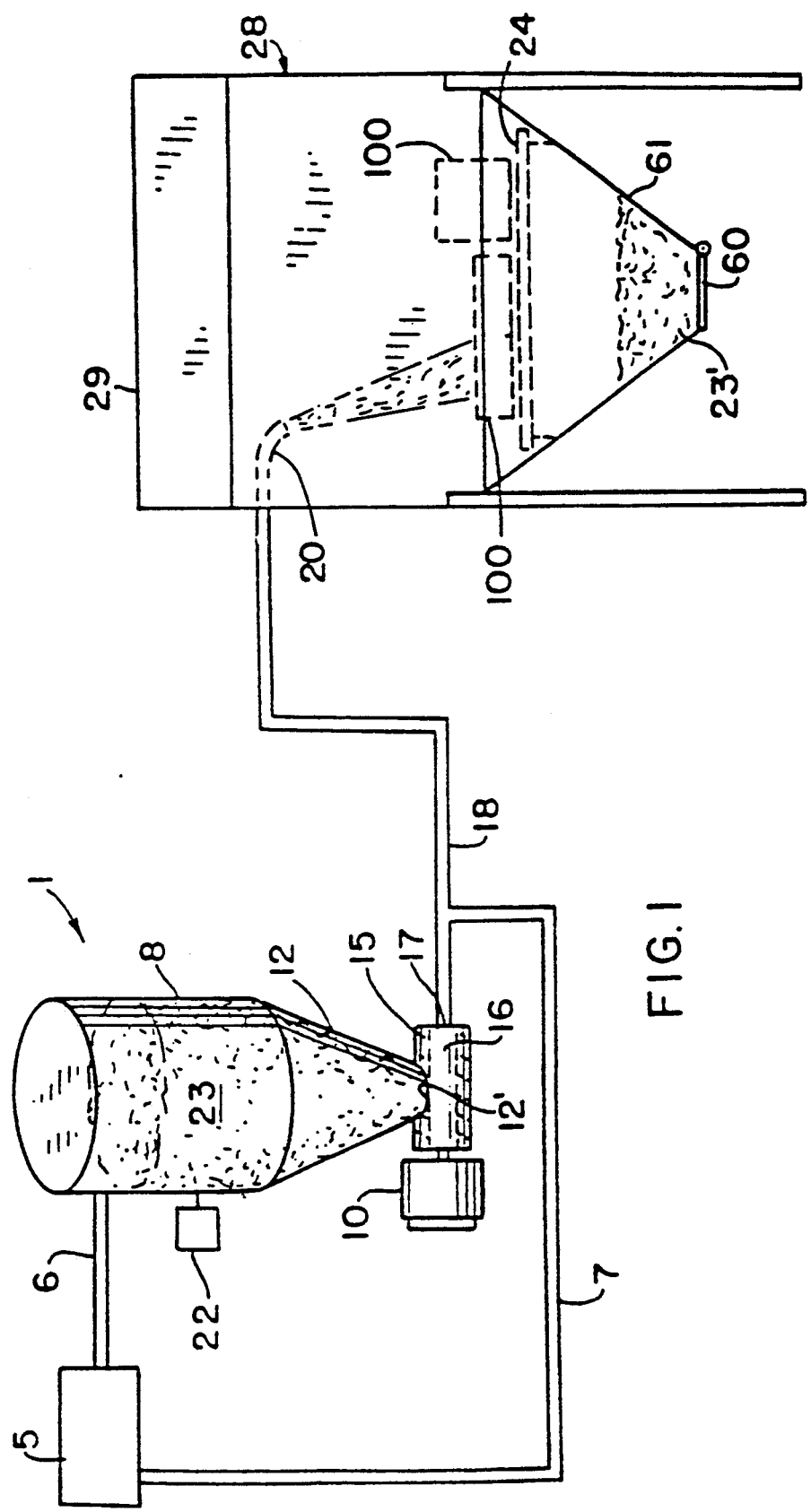
FIG. 1 is a diagrammatic representation of the pliant blasting media device of the present invention.

Turning first to FIG. 1, which shows a diagrammatic representation of the pliant media blasting device 1 of the present invention, the device comprises a hopper type storage container 8 which contains a supply of blasting media 23. The lower portion of the storage container 8 has a funnel-shaped portion 12 having an outlet 12' in the bottom thereof. An conveyer device 15 connects the outlet 12' of the storage container 8 with a discharge conduit or line 18 of preferably a ¾" I.D. pipe. The conveyer device 15 comprises a housing having a cylindrical internal bore containing a screw conveyor mechanism 16, driven by motor 10 at a desired rate of speed. The screw conveyer mechanism and the housing have a desired tolerance which ensures positive feeding of the media. The housing has an inlet (not shown) connected with the outlet 12' of the storage container and an outlet 17, remote from the housing inlet, connected with the discharge line 18. The conveyer device 15 positively and constantly meters the pliant blasting media 23 from the storage container to the discharge line.

An air supply source 5, such as model no. 185 distributed by the Ingresoil Rand Company, has a first air supply line 6 connected to the top portion of storage container 8 and a second air supply line 7 connected adjacent the connection between the discharge line 18 and the conveyer device 15. The air supply source provides pressured air at least 20 psi, and preferably at about 90 psi. As the blasting media enters into the discharge line 18 it is mixed with the pressurized air supply and then conveyed through the discharge line 18 to a discharge nozzle 20, shown in ghost in FIG. 1, where the pliant blasting media is discharged into a blasting vessel 28 to impact against the object or surface to be treated. In the above described device, it is to be noted that the entire blasting device, from the air supply source 5 to discharge the nozzle 20, is pressurized. Alternatively, a non-return valve 85 (see FIG. 2) could be positioned between the discharge line 18 and conveyer device 15 so that the conveyer device 15 and storage container 8 do not need to be pressurized.

The blasting vessel 28 is a closed container having a bottom, four sidewalls and a removable cover 29. The blasting container 28 typically has a funnel shaped bottom portion 61 which assists in the collection and recovery of the used blasting media 23'. If desired, a trap door 60 can be provided in the bottom of the vessel to facilitate removal of the used blasting media 23'. A supporting surface 24, such as a mesh screen or the like, is provided inside the vessel for supporting the objects 100 to be treated. The vessel is useful in batch processing in which the objects 100 are first placed inside the blasting vessel 28 on the support surface 24. Thereafter, the cover 29 is closed and secured in place and the pliant media blasting device 1 is activated. The media is then discharged from nozzle 20, positioned inside the blasting container 28, against the exterior surface of the objects 100 to be treated to accomplish the desired surface treatment. Once a sufficient amount of time has lapsed, the objects are checked and removed if they have been sufficiently treated. Thereafter, a second batch of objects can be treated or if the objects 100 were not sufficiently treated, they can be retreated.

In order to ensure that the pliant blasting media does not bridge or jam inside the storage container 8, and thus freely passes through the funnel-shaped portion 12 into the conveyer device 15, the storage container 8 is provided with agitation means such as vibrator device 22 located on the outside of the container, which shakes the container, or a rotatable agitator 21 (see FIG. 2) provided inside the container, which continuously mixes the media.

Figure 2:
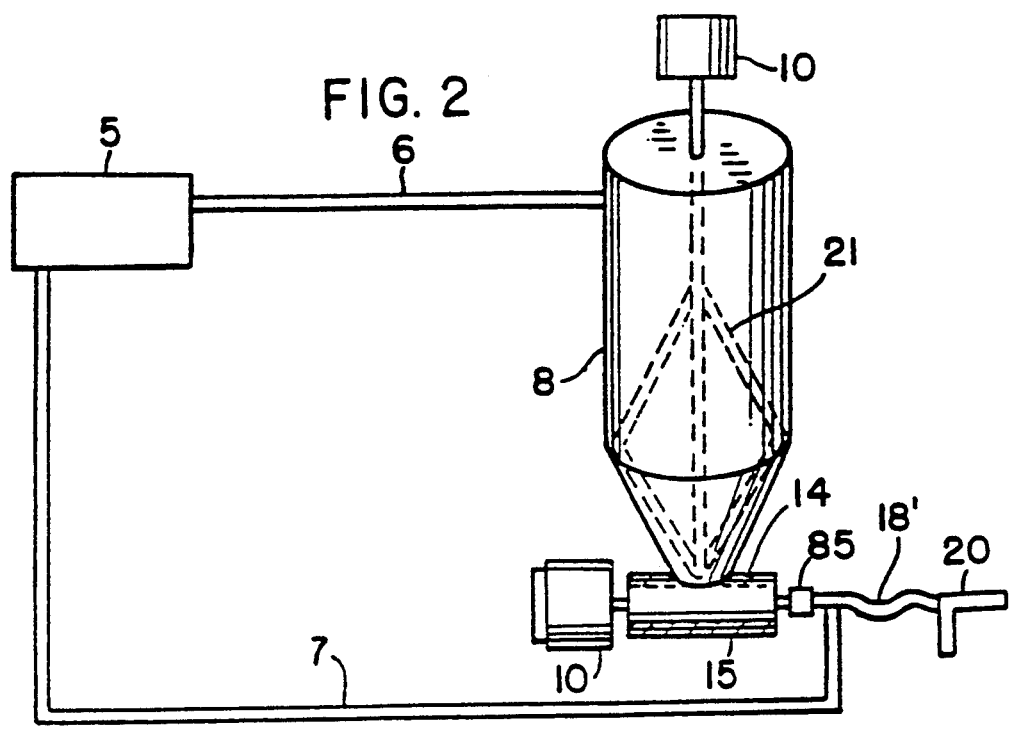
FIG. 2 is a digrammatic representation of a second embodiment of the pliant blasting media device of the present invention.

Turning now to FIG. 2, this embodiment is similar to that shown in FIG. 1 and like elements are represented by like numerals. The major difference between this embodiment and the embodiment of FIG. 1 is the use of the agitator 21, located inside the storage container 8, and a motor 10 for rotating the same and the use of a flexible discharge line 18', located adjacent the nozzle 20. The rotation of the agitator 21 helps prevent bridging and jamming of the blasting media, during use, while the flexible discharge line 18' allows an operator of the blasting device 1 to precisely control the discharge direction, impingement angle, duration and other blasting parameters of the surface being treated. The device of FIG. 2 can be used in a closed area, such as a small room or the like, if desired. However, since the pliant blasting media only minimally ricochets off the surface, recovery of the blasting media is relatively easy regardless of where it occurs.

Figure 3:
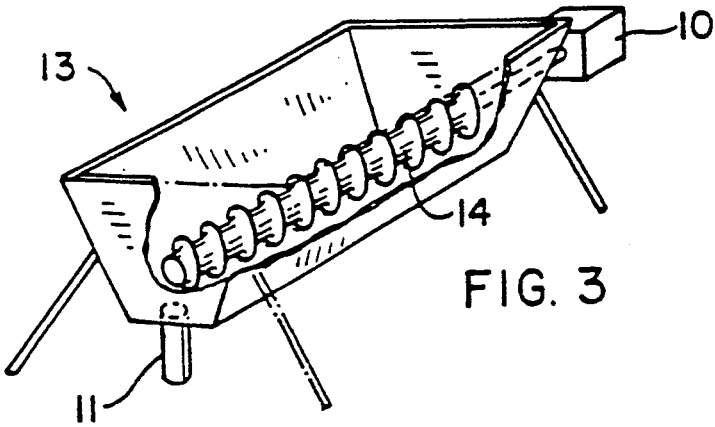
FIG. 3 is a perspective diagrammatic representation, shown partially cut away, of an alternative arrangement of the storage container for ensuring that a sufficient quantity of blasting media is supplied to the feed device.

FIG. 3 shows a trough-type supply tank 13 which could be used instead of the supply container 8. Tank 13 is provided with screw conveyor 14 in the bottom portion thereof for conveying the blasting media to an outlet 11 of the tank. The outlet is connected to a discharge line 18 via a positive feed mechanism (not shown) such as the conveyer device 15.

Figure 4:
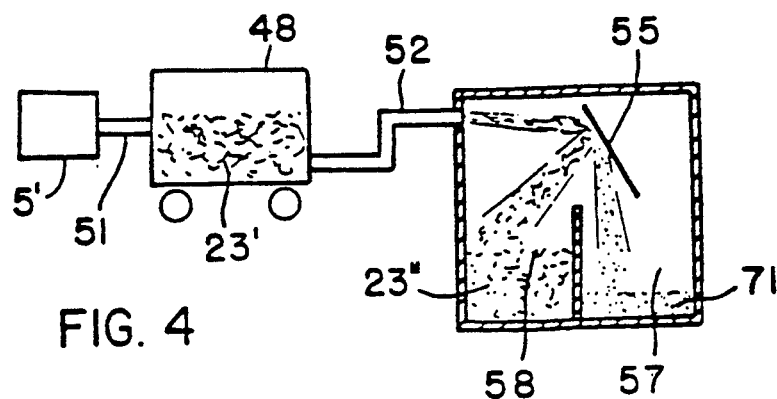
FIG. 4 is a diagrammatic representative of a device for separating recovered pliant blasting media.

FIG. 4 shows a device for separating used blasting media 23' by its physical characteristics (shape, size, resiliency, etc.). The used blasting media 23' is placed within a completely enclosed media supply container 48. Thereafter, air pressure is provided by air pressure source 5', via inlet supply conduit or line 51, and this pressurized air carries a portion of the recovered blasting media 23' contained in the container 48, through a discharge conduit or line 52, to a nozzle 54 which directs the blasting media against a deflection plate 55, typically made from metal. As a result of the characteristics of the blasting media 23', it will rebound off the deflection plate and fall into a second container 58, positioned away from the deflection plate 55, where the separated blasting media 23'' is collected. The debris and other undesired material 71 are typically not as resilient and thus they will not rebound as far from the deflection plate 55 and will fall and collect in a first container 57, located adjacent the deflection plate. Other separation devices, such as a series of appropriately sized screens, could also be used to separate the blasting media from the debris.

Figure 5:
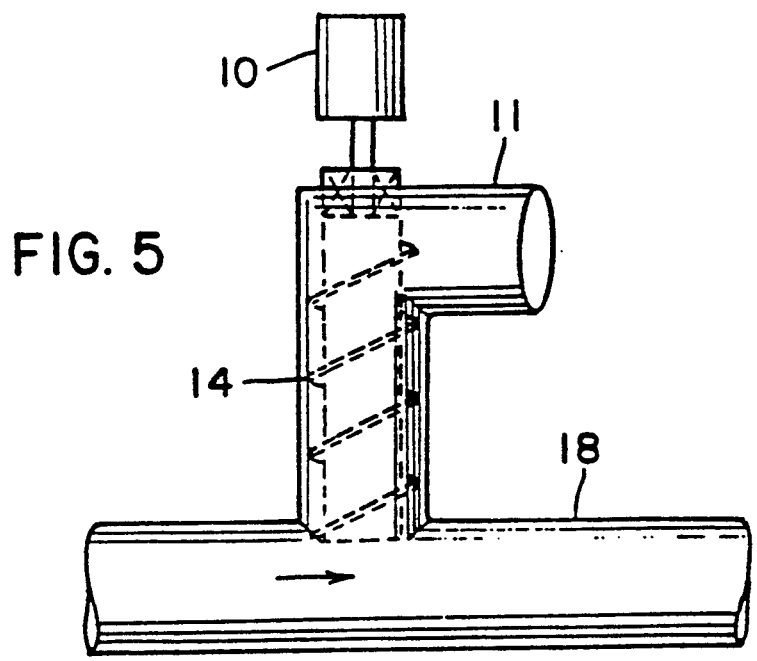
FIG. 5 shows second embodiment of the feed device for metering a sufficient quantity of blasting media into a discharge line.

FIG. 5 shows an alternate arrangement of the conveyer device 15 which is suitable for positively metering a constant amount of blasting media, in a vertical direction, from the supply container or tank into the discharge line 18. Such a feed mechanism could be used in combination with the trough-like supply tank of FIG. 3, for instance.

Figure 6:
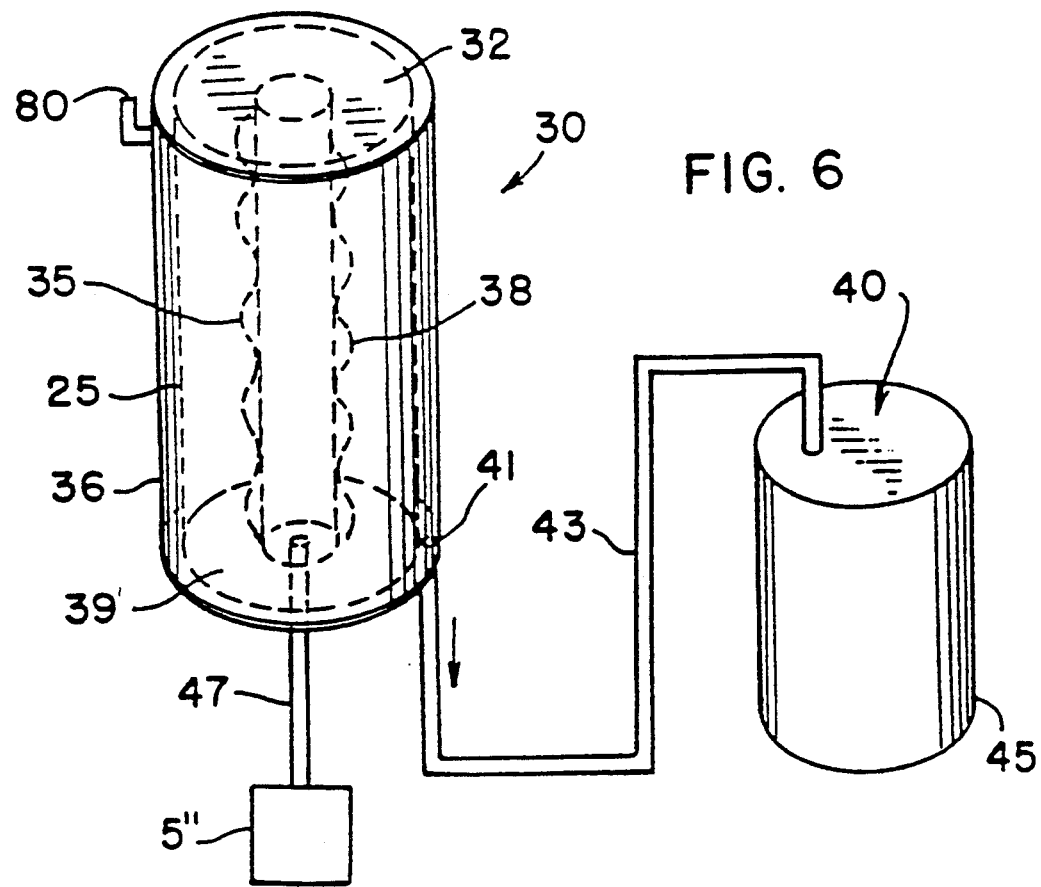
FIG. 6 shows a flushing apparatus for removing absorbed debris, liquids and/or chemicals from the pliant blasting media after use.

FIG. 6 shows a pliant media cleaning apparatus 30 used to remove absorbed liquids, chemicals and any remaining debris or undesired material from the separated blasting media 23''. The cleaning apparatus 30 comprises a container having a bottom 39, a cylindrical sidewall 36 and a removable cover 32. An elongate cylindrical perforated wall 25, having a slightly smaller diameter (approximately 1 inches or so) than that of the sidewall 36, is positioned inside the container concentrically therewith. The perforations in the wall are sized to allow the waste material to pass therethrough but retain the blasting media. The region formed between the sidewall 36 and the preformed wall 25 is in direct communication with a bleed air inlet 80 and an outlet 41 of the container, the outlet allows the liquids and debris squeezed from the blasting media to be exhausted from the apparatus. The center of the container is provided with a perforated pipe 38, shown in ghost lines, having an expandable bladder 35, made from a durable rubber or other strong but resilient material, tightly fastened to its exterior surface adjacent the top and bottom of the container. The bladder 35 is shown in its deflated position in FIG. 6. The perforated pipe is supplied with pressurized air via supply conduit or line 47 and air pressure source 5'' to thereby inflate the bladder when desired.

The blasting media is placed inside the apparatus 30 between the perforated wall 25 and the deflated expandable bladder 35. Once the apparatus has been filled with sufficient blasting media, removable cover 32 is then positioned to seal the apparatus. Thereafter, air pressure is supplied to expandable bladder 35, via pressure line 47, and this air pressure inflates the expandable bladder 35 and thereby compresses the pliant blasting media against the perforated wall 25. As the bladder 35 is further inflated and expanded it further compresses the blasting media against the perforated wall and thereby squeezes the absorbed liquids, chemicals and debris from the media. To assist in removal of the liquid squeezed from the media by this operation, vacuum can be applied to the interior of apparatus 30, via a vacuum source 40, vacuum line 43, and outlet 41. The air inlet 80 allows only a small amount of air to enter into the apparatus so that a desired vacuum is maintained within the chamber. This vacuum assists with the compression the media and carries away the liquid and debris from the apparatus. The removed material is collected inside the recovery tank 45 of the vacuum source 40 where it thereafter can be appropriately disposed of, depending upon its composition. If the media is not adequately cleaned, it can be subjected to additional clean cycles. Other compression means, such as a press and screen arrangement, can be used for removing absorbed liquids from the blasting media.

It is anticipated that the pressure applied to expandable bladder 35 will be between 20 and 60 psi, preferably 45 psi, and the partial vacuum applied to the apparatus will be between 20 and 22 inches of mercury. This combination of pressure and vacuum will ensure that the flushed blasting media, if unacceptable for reuse, can be safely disposed of in a land fill. However, other pressure and vacuum combinations will also work and are considered to be within the spirit and scope of the invention herein involved.

Figure 7:
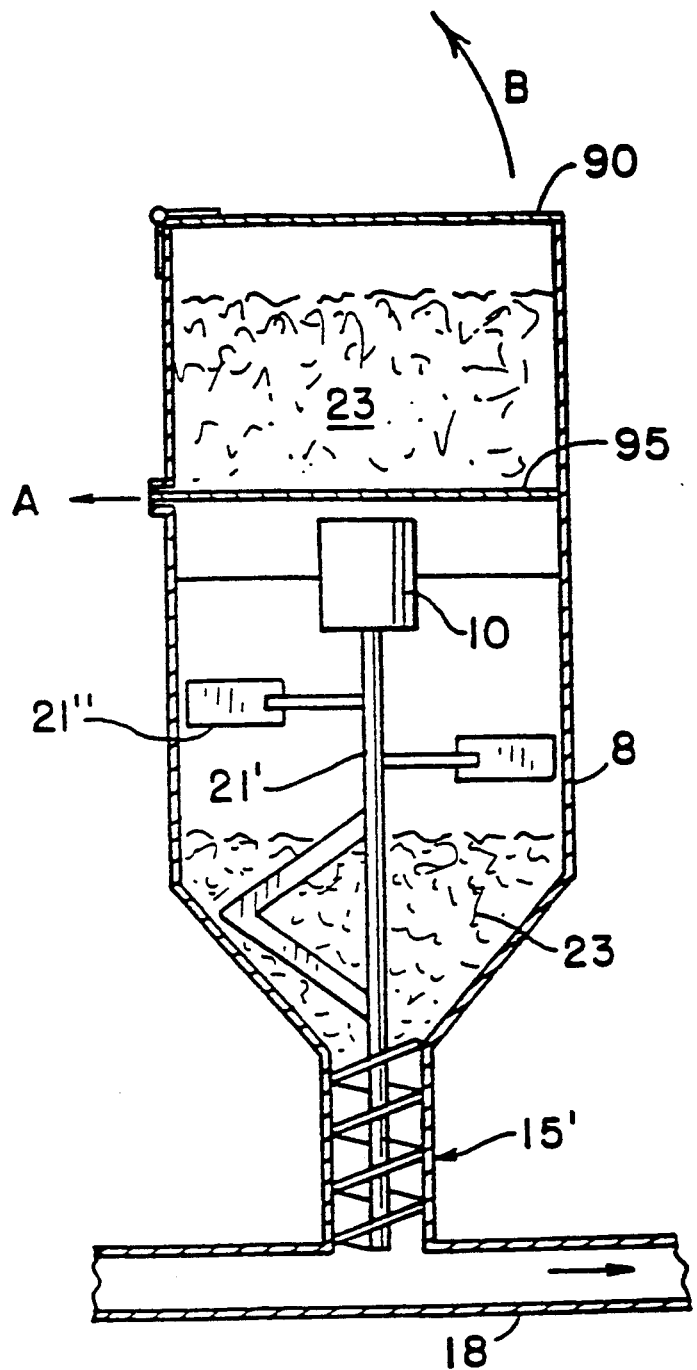
FIG. 7 is a diagrammatic representation of an alternative arrangement of the storage container and feed mechanism.

Turning now to FIG. 7, a third embodiment of the storage container is shown in which the conveyer device 15' and the rotatable agitator 21' are aligned vertically on the same axis and are both rotated by motor 10. The rotatable agitator 21' can be provided with a series of paddles or other agitations members 21'' to agitate the media contained within the container and ensure the continuous supply of media to the conveyer device 15'. The top portion of the container is provided with two doors 90, 95 which are both arranged above the motor 10. The first door 90 can be pivoted open, in the direction of arrow B, to allow additional blasting media to be added to the top portion of the storage container, i.e. on top of door 95. When the lower portion of the storage container 8 requires addition media, the first door 90 is pivoted closed and the second door 95 can thereafter be slide in the direction of arrow A to open the door and allow the blasting media to fall into the storage container without interrupting operation of the device. It is to be noted that both of the doors are provided with air-tight seals which enable them to withstand the applied pressures.

Figure 8:
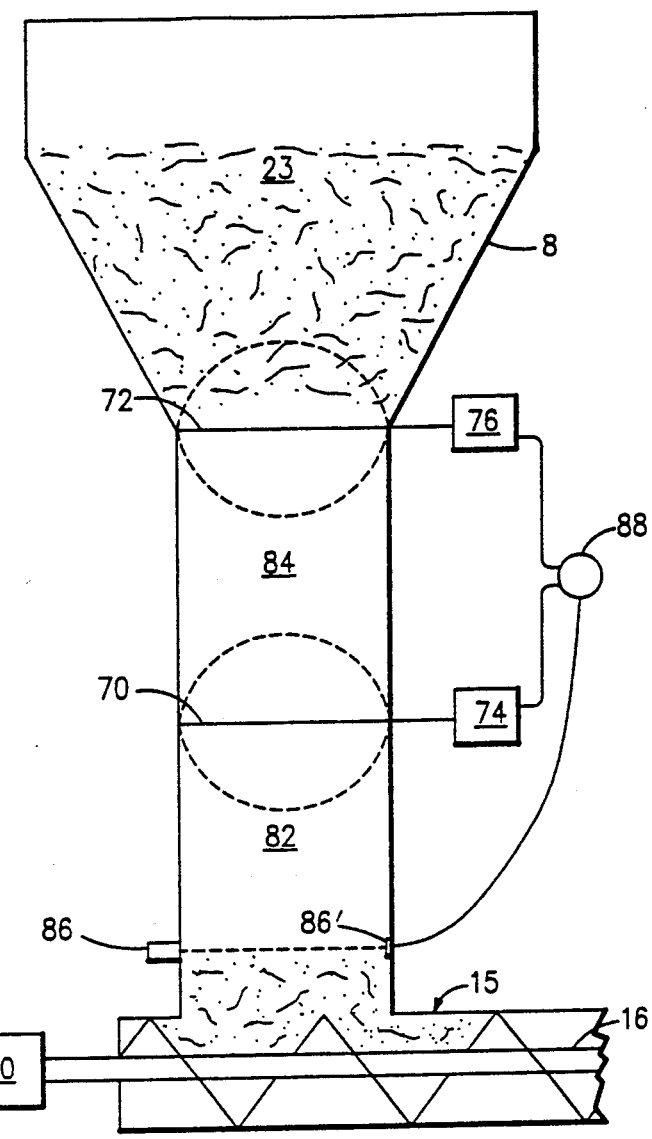
FIG. 8 is a diagrammatic representation of a further embodiment of the storage container and feed mechanism.

Turning now to FIG. 8, a still further arrangement for the storage container and feed mechanism is shown and will now be discussed in detail. In this embodiment, the top portion of the storage container 8 is open to the atmosphere so that it may be continually supplied with virgin and/or recycled blasting media 23 during use.

The lower portion of the container funnels into a cylindrical shaped elongate portion which is provided with a pair of vertically aligned, spaced apart butterfly valves or other similar valves 70, 72 that are operated by pneumatic, hydraulic or electrical means 74, 76, respectively. The valves chosen must be able to achieve an air tight seal, when in a closed position, which is able to withstand air pressures of about 100 psi, or even greater, and 3" butterfly valves manufactured by Watts Fluid Air of Portsmouth, N.H. have performed satisfactorily. The two valves 70, 72 operate independently of one another, i.e. one of the valves is always closed during operation, so as to maintain the pressurization of the blasting system. The butterfly valves 70, 72 and the conveyor device 15 divide the lower cylindrical portion of the storage container into two separate compartments 82, 84 which assist with batch feeding of the blasting media from the top portion of the storage container to the conveyor device 15. The first compartment 82 is defined between the conveyor device and the first butterfly valve 70 and the second compartment 84 is defined between the first butterfly valve 70 and the second butterfly valve 72.

The device operates as follows. Prior to activating the device, both of the butterfly valves 70, 72 are moved to an opened position (shown in ghost in FIG. 8) by the means 74, 76 and the blasting media 23 supplied to the top portion of the storage container is this allowed to fall by gravity into and fill the first and second compartments 82, 84. Thereafter, butterfly valves 70 and 72 are closed by the respective means 74, 76 so that an air tight seal is formed by each one of the rotatable butterfly valves 70, 72 for maintaining the air pressure of the system. Additional blasting media is then placed in the top portion of the storage container and the device is activated so that blasting of a desired surface can commence. When additional media is required by the conveyor device 15, the first butterfly valve 70 is opened and this allows the blasting media 23 contained within second compartment 84 to fall, by gravity, into the first compartment 82. The opening of butterfly valve 70 also allows the pressurized air of the system to pressurize the second compartment 84. Next, butterfly valve 70 is closed and butterfly valve 72 is then opened to allow the blasting media 23 contained within the top portion of the storage container to fall within the second compartment 84. It is to be noted that as second compartment 82 has been pressurized, upon opening of butterfly valve 72 an instantaneously release of the pressurized air occurs and it impacts again the blasting media 23 in the top portion of the storage container adjacent the butterfly valve 72. This air blast helps to loosen the blasting media and prevents bridging or jamming so that a continuous supply of blasting media is provided to the second compartment 84. The rotation of the butterfly valve 72 also assists with preventing bridging or jamming. Lastly, the butterfly valve 72 is then closed until additional blasting media 23 is required. When this occurs, butterfly valve 70 is opened so that the blasting media contained in second compartment 84 can fall into the first compartment 82 and the above process is then repeated.

The means 74 and 76 can be operated manually or can be controlled automatically when a sensor 86, such as a photo electronic sensor or the like, is provided in the cylindrical portion adjacent the convey means 15 to indicate when the first compartment 82 is about to run out of blasting media. The sensor 86 interacts with the control means 88 which sequentially activates means 74 or 76 to open automatically the valve 70 or 72 for a predetermined length of time so that automatic batch feed is achieved. If manual operation is utilized, a sight glass may be employed, instead to the sensor 86, to assist the operator with controlling the feed of the conveyor device.

Figure 9:
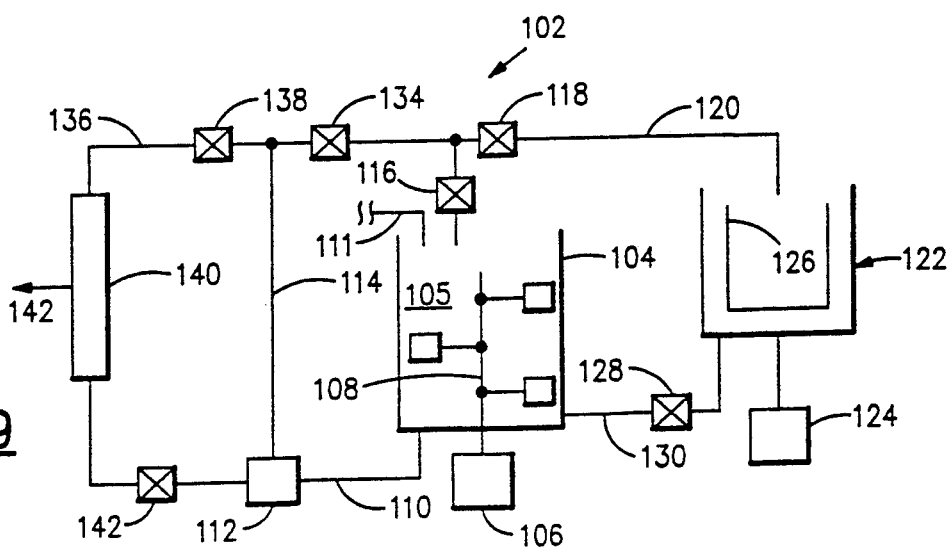
FIG. 9 is a diagrammatic representation of a further embodiment of the flushing apparatus for removing absorbed debris, liquids and/or chemicals from the pliant blasting media after use.

Turning now to FIG. 9, a second cleaning apparatus 102 used for removing absorbed liquids, Chemicals, debris or other undesired materials from the used blasting media 23 will now be discussed in detail. The cleaning apparatus comprises a washing container 104 into which the used blasting media 23 is placed. Water and/or some other cleaning fluid 111 is added to the container 104 to form a blasting media/liquid slurry 105. Additives 150 such as soaps, degreasing agents and the like may be added to the cleaning fluid, if desired. A motor 106 is connected with agitating means 108, via a suitable water tight drive connection, to agitate the media/liquid slurry 105 and assist with removing and/or dissolving of the absorbed liquids and solids from the interstices of the blasting media. To further assist with agitation, the slurry can be circulated by pump 112 which has an inlet connected with the base of the container 104 by conduit means 110 and has an outlet connected with the top portion of the container by return conduit means 114. Once the slurry has been sufficiently agitated so that a majority of the solids, liquids and other debris have been dissolve and/or removed from the blasting media and suspended within the slurry, valve 116 of conduit means 114 is closed and valve 118 of conduit means 120 is opened. This enables the pump 112 to supply the slurry to a centrifuge 122 via the conduit means 120. The centrifuge 122 comprises a motor 124 which is connected to a rotatable drum 126 via a suitable water tight drive connection. When the centrifuge 122 is rotated at a sufficient speed, the liquids and other debris are thrusted radially outward through a mesh screen, lining the interior of the rotatable drum 126, thereby separating the cleaned blasting media from its contaminants. A suitable centrifuge could be a modified washing machine, such as a machine manufactured by Sears, Roebuck & Co., and it is anticipated that other similar centrifuges will also provide satisfactory results. After the centrifuging of the media 23 is completed, valve 128 of conduit means 130 is then opened and the liquid separated by the centrifuge is pumped by pump 112, via conduit means 130 and 110, to a filter 140. In order for this to occur, valve 134 of conduit means 114 must be closed and valves 138 and 142 of conduit means 136 must be opened. After this pumped liquid has been sufficiently filtered and cleaned by the filter 140, it is then pumped back into the container 104, by closing valve 138 and opening valve 134, to be used for an additional cleaning cycle. The material 142 removed by filter 140 then can be appropriately treated, depending on its composition, and disposed of properly, e.g. in a land fill or the like.

Figure 10:
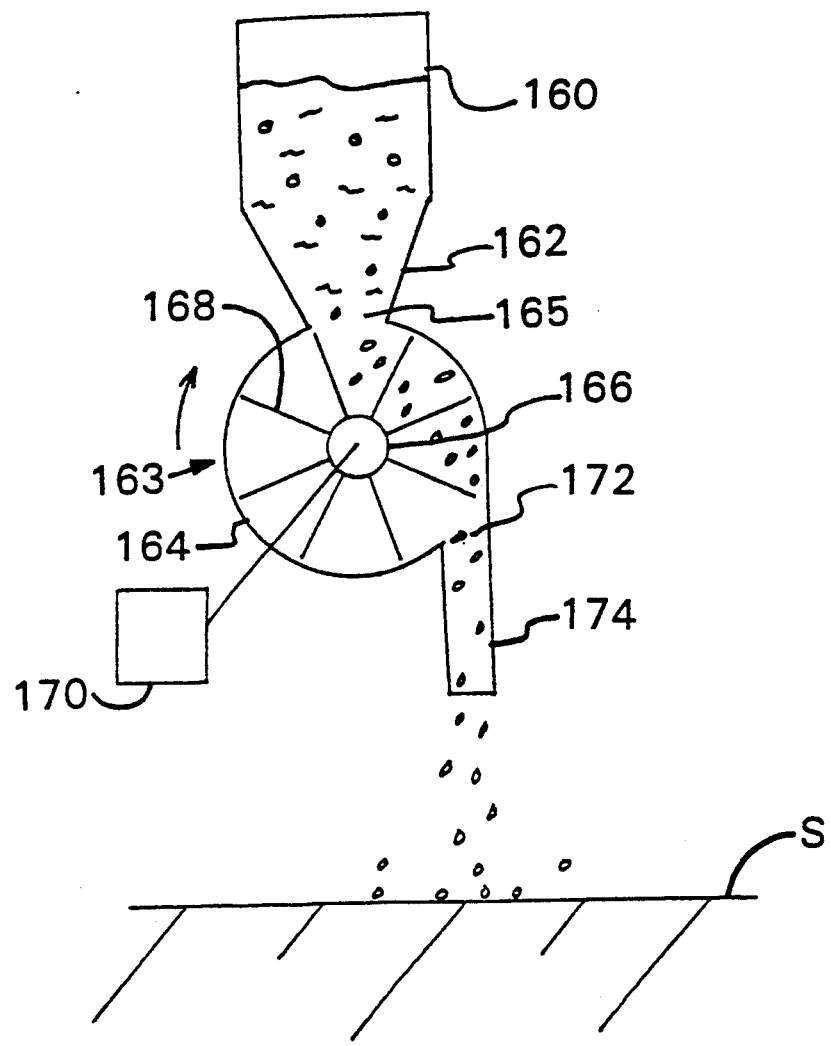
FIG. 10 is a diagrammatic representation of a third embodiment of the pliant blasting media device of the present invention.

Turning now to FIG. 10, the third embodiment of the present invention will now be discussed. This embodiment comprises a hopper or other storage container 160 containing an ample supply of the pliant particular blasting media impregnated with a powder. The outlet of the storage container is connected with media accelerator means 163 via a media feed conduit or feed mechanism 162. The media accelerator means comprises an exterior housing 164 containing a rotatable wheel 166 having a plurality of radially extending tines 168. The wheel 166 is appropriately supported and driven at a high speed of rotation, e.g. typically between 500 and 10,000 rpm, by a motor or other suitable wheel driving device 170. The pliant media is conveyed by the feed mechanism 162 into an inlet 165 of the housing 164 and carried by one of the plurality of tines 168 of the wheel 166 rotating at a high speed of rotation and accelerated and exhausted through an outlet 172 and directed by a conduit 174 against a surface S to be treated. If desired, the outlet end of the device may be provided with a nozzle or other flexible member to assist with aiming and/or directing the propelled media against a desired area of the surface S to be cleaned.

There are a variety of known devices for use in accelerating blasting media by centrifical force. An example of a device suitable for propelling the pliant blasting media impregnated with a powder is sold under the trademark BLASTRAC (R) by The Wheelabrator Corporation of Shenandoah, Ga. Another suitable device is the "Porta-Shotblast" machine manufactured by Nelco Manufacturing Corp. of Oklahoma City, Okla.

Figure 11:
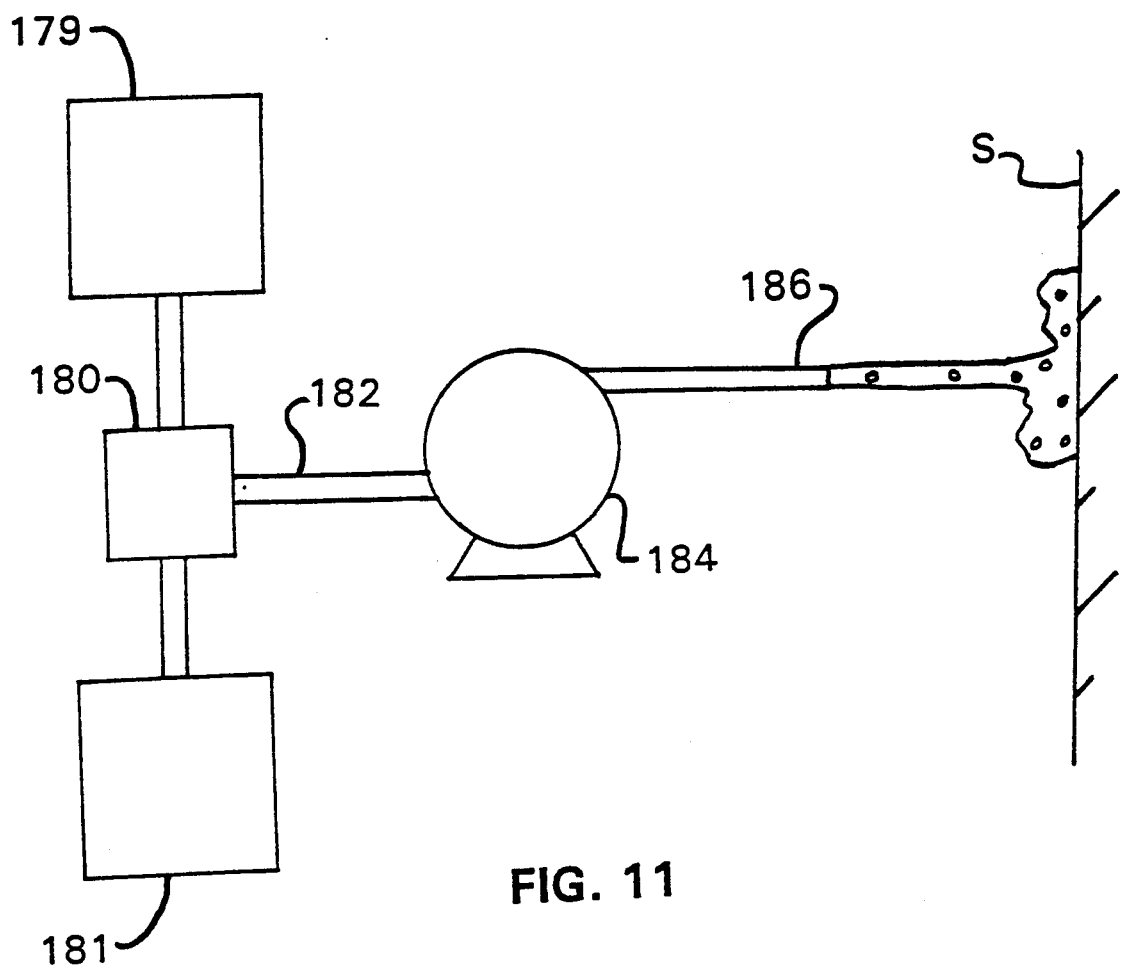
FIG. 11 is a diagrammatic representation of a fourth embodiment of the pliant blasting media device of the present invention.
Figure 12:
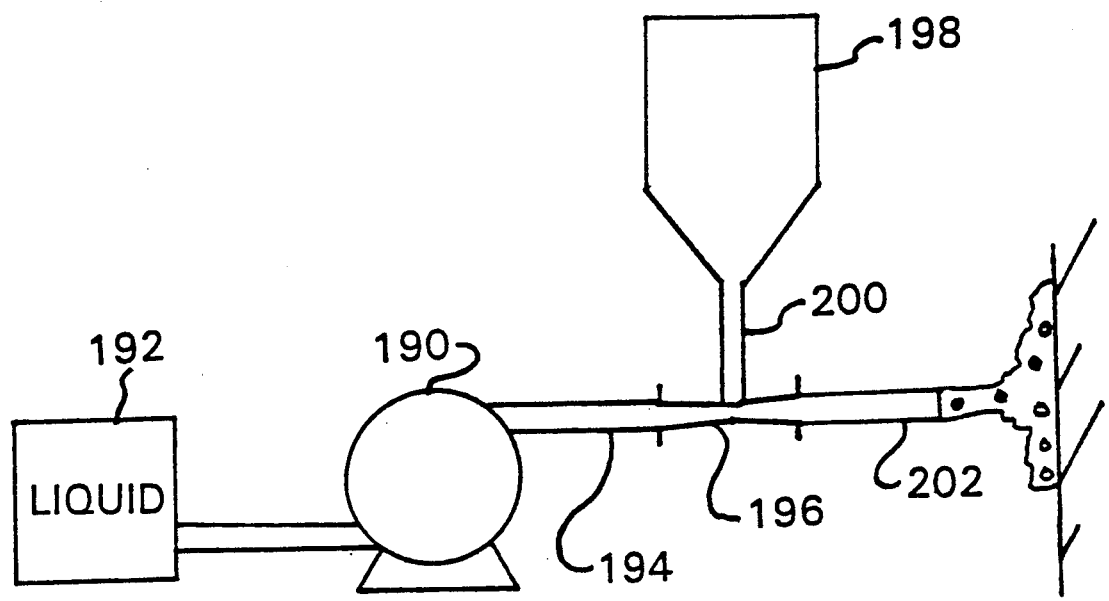
FIG. 12 is a diagrammatic representation of a fifth embodiment of the pliant blasting media device of the present invention.

Turning now to FIGS. 11 and 12, two arrangements using a liquid (water) as a medium for conveying the pliant blasting media impregnated with a powder will now be discussed. According to a forth arrangement, the pliant blasting media 179 and the liquid medium 181 are mixed together in a mixing chamber 180 to form a media and liquid slurry and the slurry is conveyed via a conduit 182 to a pump mechanism 184 where the slurry is accelerated and exhausted at high pressure via an outlet conduit 186 and discharged against a surface S to be treated (FIG. 11). An example of a device suitable for propelling a liquid slurry of the pliant blasting media impregnated with a powder is sold under the trademark "Jetstripper" and manufactured by WhiteMetal Inc., of Houston, Tex.

According to a fifth arrangement, the liquid (water) is pumped by a pump mechanism 190 from a liquid supply source 192 and is conveyed via a conduit 194 to an inlet of a venturi 196. A supply of pliant blasting media 198 is fed by gravity via a feed mechanism 200, connected adjacent a throat portion of the venturi 196, where the pliant blasting media 198 is drawn or sucked into the pressurized liquid stream, mixed with the pressurized liquid and conveyed against the surface S to be treated. The outlet of the venturi 196 is connected to an outlet conduit 202 which controls the impact direction of the high pressure mixture of the pliant blasting media and the liquid. This type of liquid conveying system typically incorporate extremely high pressures (up to about 40,000 psi) and relatively low water volumes. The pumps, conduits and other associated equipment are all sized to handle such pressure requirements. An example of suitable liquid conveying equipment, incorporating a venturi, is the FLOW Waterjet System manufactured by Flow International Corporation of Kent, Wash.

It is anticipated that the cleaning apparatus can also be automatically controlled by computer means so that the pump, the valves, the centrifuge and the filter are all timed to occur in a predetermined sequence. Such automation minimizes the operator attention and renders the system more efficient for use.

The present invention allows both the blasting media and cleaning fluid to be used repeatedly and minimizes the amount of end product which has to be properly disposed of thereby resulting in a system which is very efficient to operate and has a minimal impact on the environment.

If necessary, a solvent, chemical or other cleansing agent can be added to the pliant blasting media in the cleaning apparatus and allowed to react for a time before the cleaning cycle commences. The addition of such additives help dissolve and/or remove harmful liquids or chemicals from the pliant blasting media. In addition, the pliant blasting media can be pretreated with a solvent, chemical, cleansing agent, liquid and/or powder, before the blasting media is used in the device 1, to enhance the media's surface treatment. Depending on the amount of liquid absorbed by the media, this will increase the density of the media and thereby increase its abrasiveness. An important feature of the pliant blasting media is its ability to entrap debris, liquids, solvents, etc., within its interstices and carry such materials away from the surface being treated.

Since certain changes may be made in the above described pliant media blasting device, separation device and cleaning system, without departing from the spirit and scope of the invention herein involved, it is intended that all subject matter contained in the above description and shown in the accompanying drawing shall be interpreted as an illustrated and not in the limiting sense.

Wherefore, I claim:

1. A method of treating a contaminated surface with a plurality of discrete, individual particles of a pliant particulate blasting media capable of absorbing a contaminant from said surface, said method comprising the steps of:
    a) using a dry light resilient absorbent cellular material as the pliant particulate blasting media;
    b) pretreating the pliant particulate blasting media with a dry powder to increase the density and abrasiveness of said pliant particulate blasting media;
    c) rotating a rotatable wheel, having a plurality of tines, at a high rotational speed within a housing having a housing inlet and a housing outlet;
    d) conveying said pliant particulate blasting media, pretreated with a dry powder to increase the density and abrasiveness of said pliant particulate blasting media, from a storage container to said housing inlet;
    e) accelerating said plaint particulate blasting media via said plurality of tines of said rotating wheel; and
    f) discharging said accelerated pliant particulate blasting media from said housing outlet against the contaminated surface and absorbing contaminant from said surface with said absorbent cellular material.

2. The method according to claim 1, further comprising the step of rotating said rotating wheel at a speed of between 500 and 10,000 revolutions per minute.

3. A method of treating a contaminated surface with a plurality of discrete, individual particles of a pliant particulate blasting media capable of absorbing a contaminant from said surface, said method comprising the steps of:
    a) using a dry light resilient absorbent cellular material as the pliant particulate blasting media;
    b) pretreating the pliant particulate blasting media with a dry powder to increase the density and abrasiveness of said pliant particulate blasting media;
    c) supplying a flow of pressurized liquid to an inlet of a venturi;

d) supplying said pliant particulate blasting media, pretreated with a dry powder to increase the density and abrasiveness of said pliant particulate blasting media, from a storage container to said venturi so that, during operation, the flow of the pressurized liquid draws said pliant particulate blasting media, pretreated with a dry powder, into the flow of pressurized liquid;

e) mixing said pressurized liquid and said plaint blasting media, pretreated with a dry powder, together at an outlet of said venturi to form a pressurized liquid mixture thereof; and f) discharging said pressurized liquid mixture from the outlet of said venturi against the contaminated surface and absorbing contaminant from said surface with said absorbent cellular material.

4. A method according to claim 3, further comprising the step of using water as said pressurized liquid.

5. A method of treating a contaminated surface with a plurality of discrete, individual particles of a pliant particulate blasting media capable of absorbing a contaminant from said surface, said method comprising the steps of:

a) using a dry light resilient absorbent cellular material as the pliant particulate blasting media;

b) pretreating the pliant particulate blasting media with a dry powder to increase the density and abrasiveness of said pliant particulate blasting media;

c) mixing, in a mixing chamber, said pliant particulate blasting media comprising a dry light resilient absorbent cellular material pretreated with a dry powder to increase the density and abrasiveness of said media with a liquid to form a slurry thereof;

d) conveying, via a pump, said slurry under pressure to an outlet; and e) discharging said slurry from said outlet against the contaminated surface and absorbing contaminant from said surface with said absorbent cellular material.

6. A method according to claim 5, further comprising the step of using water as said pressurized liquid.

* * * * *